Jan. 19, 1960
W. H. DU SHANE 2,921,638
SELECTIVE LOAD AND POSITION CONTROL FOR
AGRICULTURAL TRACTOR
Filed June 20, 1955
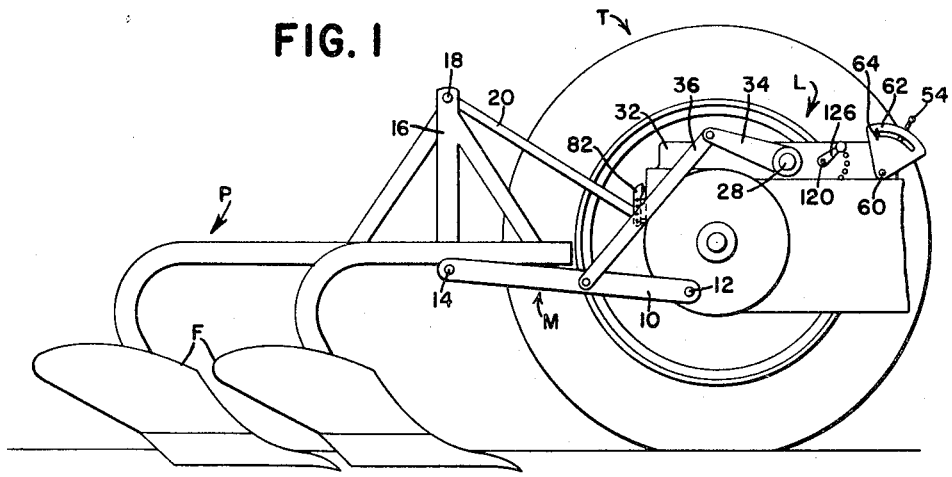
FIG. 1
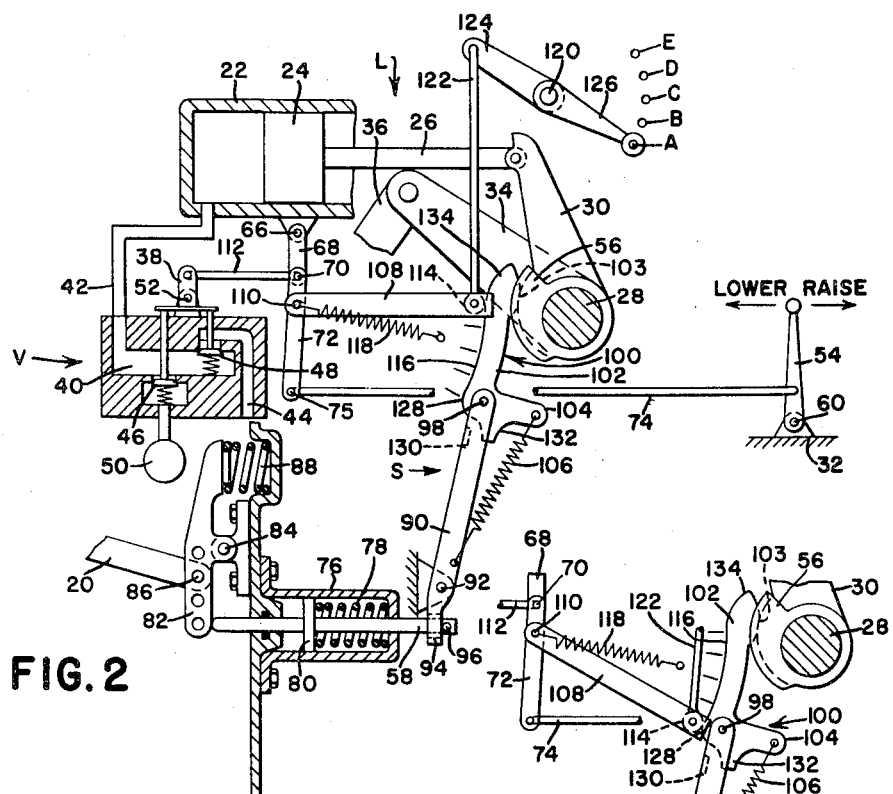
FIG. 2
FIG. 3
INVENTOR.
W. H. DuSHANE United States Patent Office 2,921,638
Patented Jan. 19, 1960

2,921,638

SELECTIVE LOAD AND POSITION CONTROL FOR AGRICULTURAL TRACTOR

Wallace H. Du Shane, Waterloo, Iowa, assignor, by mesne assignments, to Deere & Company, a corporation of Delaware Application June 20, 1955, Serial No. 516,347

13 Claims. (Cl. 172—9)

This invention relates to an agricultural implement control and more particularly to a selective control for regulating the working position of an agricultural implement relative to a tractor by which the implement is drawn.

Those familiar with the art are conversant with the so-called Ferguson load or draft control system in which the working position of a ground-working tool or similar implement is first selected by a manual control and the draft or working load on the implement is balanced against a spring so that the draft or working load remains substantially constant. The various advantages and disadvantages of a system of this type are sufficiently well known as to require no elaboration here, as is the case with the advantages and disadvantages of the so-called position control system in which the position of the manual control lever is proportional to the working depth of the implement and the working depth does not vary regardless of changes in draft load.

In at least one instance in the prior art, as represented for example by the disclosure in assignee's copending application Serial Number 258,231, filed November 26, 1951, now Patent No. 2,721,508, there has been evolved a combination of the load and position control systems so as to obtain the benefit of the advantages of both of them. In some instances, designs have been provided which afford either but not both of the systems; that is to say, the user may employ load control or position control but the design contains no provision for combining the two. According to the present invention, such combination is made possible so that a compound system is available in which the implement may operate under load control exclusively, position control exclusively or a combination of both in various degrees, hereinafter sometimes referred to as the position-compensated phases of the improved system.

It is an important feature of the invention to achieve this improved system by the use of compound servo means having a plurality of elements, one of which is exclusively under the control of means movable in response to the attainment by the implement of different working positions, another of which is movable in response to changes in working load on the implement, and still another of which is movable at times by one responsive means and at other times by the other responsive means. The invention features a novel and economical design in which these and other advantages are achieved through the use of simple linkages involving variations in moment arms and fulcra, all of which, together with other features and inherent advantages, will be brought out in the following detailed description and accompanying sheet of drawings, the several figures of which will be described immediately below.

Fig. 1 is a representative illustration of a tractor and connected implement.

Fig. 2 is a schematic view, partly in section, showing the details of the control system, with the system positioned for position-responsive control.

Fig. 3 is a fragmentary duplication of a portion of Fig. 2, with the exception that the system is positioned or operating in load control.

The agricultural vehicle-implement outfit comprises a tractor T and a plow P, the tractor having means M for the adjustable attachment thereto of the implement or plow. The illustrated components of the outfit are representative only, the plow being chosen because it is a good example of an implement on which draft or load values will change according to such factors as density of the soil, changes in the level of the terrain, etc. Any other implement subject to a working load could be substituted for the plow.

The implement attaching means M comprises a pair of lower draft links 10, each pivoted at 12 at its forward end to the tractor and each pivoted at 14 at its rear end to the plow. Because of the pivotal connections just described, the vertical position of the plow may be changed so that a pair of plow bottoms F may operate at any one of several selected working depths. The plow includes rigid mast structure 16 to the upper end of which is pivotally connected at 18 a forwardly extending top link 20 which comprises part of the attaching means M and which functions to operate a power unit L in response to changes in draft or working load on the plow.

The power unit shown here is of the hydraulically powered type comprising a tractor-mounted cylinder 22 within which a piston 24 is fluid-pressure operated to act through a piston rod 26 for rocking a tractor-mounted rockshaft 28 by means of an arm 30 connected to the piston rod 26 and rigidly secured to the rockshaft 28. In any of the well known designs, the power unit L, together with other components to be presently described, is carried in a secondary housing or casing, such as that shown at 32 in Fig. 1, provided as an integral part of the tractor. It will be appreciated that in the interests of clarity the several components as shown in Fig. 2 are somewhat separated from the relative positions that they would occupy in a commercial design. However, the functional relationship of the parts is adequately depicted for present purposes.

As part of the power unit L, the rockshaft 28 carries a pair of external arms 34, and each arm is connected by a lift link 36 to the respective draft link 10. The arrangement is such that rocking of the rockshaft 28 will raise or lower the draft links 10, according to the direction of rocking of the rockshaft, and will therefore effect adjustment of the working position of the plow bottoms F.

A control valve assembly V is operated by a movable actuator 38 for controlling the power unit. The valve assembly includes an internal motor chamber 40 that is selectively connectible with a motor line 42 and an exhaust line 44 respectively by means of spring-loaded high-pressure and exhaust poppet valves 46 and 48.

A pump 50 supplies fluid under pressure to the motor chamber 40 when the high pressure poppet valve 46 is opened. Although any type of control system could be used, that shown is of the closed-center type (constant pressure-variable volume), enabling the use of the poppet valve arrangement illustrated. The details could, however, be varied to suit the individual.

The actuator 38 is pivoted at 52 on the valve assembly V so as to be selectively rockable in opposite directions, thereby acting against the stem of one or the other of the poppet valves to open that poppet valve exclusively of the other. For example, when the actuator 38 is moved in a counterclockwise direction, it acts against the stem of the high-pressure poppet valve 46, opening that valve so that fluid under pressure is supplied to the left-hand end of the piston 24, moving the piston to the right and rocking the rockshaft 28 in a clockwise direction so as to effect raising of the plow P. During that phase of operation, the spring behind the poppet valve 48 keeps that valve closed. Conversely, when the actuator 38 is moved to rock in a clockwise direction, it depresses the stem of the poppet valve 48, opening that valve and permitting fluid to exhaust from the left-hand end of the piston via the motor line 42, motor chamber 40 and exhaust line 44. When the actuator 38 depresses the poppet valve 48, the high-pressure poppet valve 46 is closed by its spring.

As will be brought out in detail below, the actuator 38 is under control of several motion-initiating means, including a hand lever 54, a position responder 56 and a draft or load responder 58.

The hand lever 54 may be conventionally pivoted at 60 to a portion of the power unit casing 32 and is shown as being typically associated with a sector 62. The relationship between the lever 54 and sector 62 is such that any selected position of the lever 54 within the range of the sector is releasably maintained, as by friction means (not shown), many examples of which are in commercial use. A depth stop 64 is carried in an arcuate slot in the sector to afford an adjustable stop for the lever 54.

A tractor mounted pivot 66 supports a swingable suspension link 68 from which is pivotally suspended at 70 a depending link 72. A control rod 74 is pivotally connected at one end at 75 to the lower end of the link 72 and is pivotally connected at its other end to a midpoint of the hand lever 54.

The position responder 56 is illustrated here as being in the form of a cam rockable with the rockshaft 28 and therefore movable by the power unit in accordance with adjustment of the implement. The load responder 58 is slidably mounted in an internal housing 76 which contains a spring 78 that acts against a responder-carried collar 80 to resiliently oppose shifting of the responder 58 to the right. The outer or left-hand end of the responder acts against a lever 82 which is fulcrumed intermediate its ends at 84 on a rear part of the tractor and which is pivotally connected at 86 to the front end of the top link 20.

During operation of the tractor and plow, draft load exerted in a rearward and downward direction against the plow bottoms F will tend to cause the plow to rock in a clockwise direction about the pivot 14, thus exerting a forward compressive force through the top link 20 against the draft responder lever 82. As is well known, this compressive force will be opposed by the draft responder spring 78. In the operation of some types of implements, the forces in the top link are actually reversed; that is, the top link is placed in tension rather than in compression, reflecting what are known as minus values in draft load. For this purpose, the end of the draft responder lever 82 opposite to the engagement thereof with the draft responder 58 is opposed by a compression spring 88. These details are, however, of no material significance in this case and it may be assumed that the load responder 58 is representative of conventional constructions, to the extent described.

The relationship between the position responder 56 and the load responder 58, so far as affects the ability of either or both to control the actuator 38 is established by compound servo means S. This servo means includes a first lever 90 pivoted at 92 on a portion of the tractor and having one end proximate to and the other end remote from the load responder 58. The end proximate to the load responder is connected to the load responder by means enabling the lever 90 to move in response to changes in position of the load responder as the load responder moves fore-and-aft. The illustrated means includes an apertured end 94 on the lever through which the load responder extends to receive a pin 96. The aperture in the lever end 94 is of such size that the connecting relationship, including the pin 96, establishes a force-transmitting fulcrum connection to the load responder.

The remote end of the lever 90 has a pivotal or fulcrum connection at 98 with a second or control lever 100, which control lever is in the form of a bell crank having one arm 102 in cam-riding contact at 103 with the position responder cam 56 and another arm 104 tensioned by a spring 106 to the lever 90 to resiliently maintain the cam-riding contact of the arm 102 as well as to bias the lever 90 for counterclockwise rocking about the pivot 92.

The cam-engaging end of the control lever 100 is rounded so as to achieve preferably a minimum area of contact with the cam at 103 and thereby affords a force-transmitting fulcrum connection to the position responder 56. That is to say, the control lever 100 may not only be moved by the responder but may be moved relative to the responder. The control lever 100 has a second fulcrum connection to the responder 58, established by the pivot 98, the lever 90 and the connection at 94 and 96. In its broadest sense, any connection of the lever 90 to the load responder 58 may be regarded as a satisfactory equivalent so long as it is operative to enable the lever to reflect movement of or be moved by the load responder. The particular pivoted connection at 92 is introduced here to obtain the necessary reversal of motion and is therefore an incident of the illustrated embodiment of the invention.

A force-transmitting member 108 is connected at one end to the actuator 38 and has means connecting its other end to the servo means S, the details of which will be described immediately below. The connection of the one end of the member 108 to the actuator 38 is effected by means of a pivotal connection of the member 108 at 110 to the previously described link 72, plus a second link 112 that is connected at one end to the actuator 38 and at its other end to the point 70 between the link 72 and the suspension link 68. The connecting means for the servo-proximate end of the force-transmitting member 108 is effected by means of a member-carried element in the form of a follower or roller 114 which is adapted to engage any one of a plurality of selected points along an arcuate track portion or means 116 formed on the control lever arm 102. The arc of the track portion is preferably formed about the pivot point 110. A tension spring 118, connected between the point 110 and an anchor point on the tractor, serves as means biasing the force-transmitting member or link 108 in such direction that the roller 114 remains in contact with the track 116 on the lever 100.

The connecting means at 115 is selectively positionable along the lever track to vary the relationship thereof to the fulcrum connection at 98 and the fulcrum connection at 103 established by the cam-riding contact of the arm 102 with the position responder cam 56. Variation in this relationship accordingly results in variation of the degree to which the member 108, and consequently the actuator 38, will be moved by one or the other or both responders.

The selector means for effecting adjustment of the connecting means at 114–116 preferably comprises a small rockshaft 120 journaled in the casing 32 for the power unit L. An adjusting or suspension link 122 is connected to the front end of the force-transmitting member 108 and is connected at its upper end to an internal arm 124 keyed to the rockshaft 120. This rockshaft extends externally of the casing 32 and has fixed to its outer end a control or selector arm 126 in the handle of which may be contained any suitable detent means for selectively locking the control arm 126 in any one of a plurality of positions as represented by holes or detent-receiving notches A, B, C, D and E. As shown in Fig. 2, wherein the selector rockshaft control arm 126 is in position A, the force-transmitting member 108 is in such position that its roller means 114 contacts the track 116 of the control lever 100 substantially in fore-and-aft alinement with the fulcrum connection or cam contact 103.

Fig. 3 shows the force-transmitting member 108 moved downwardly so that the roller 114 contacts the control lever track 116 at a point 128 that is substantially in fore-and-aft alinement with the fulcrum connection 98, in which case the selector control arm 126 will have been moved to position E. As will be apparent, the selector control means may be also set at any one of the intermediate positions B, C or D, and corresponding positions of the roller 114 relative to the track 116 will be achieved, as suggested by the short radial lines along the track 116 in Figs. 2 and 3.

Interengaging stops 130 and 132, respectively on the levers 90 and 100, are engageable to limit clockwise rocking of the lever 100 relative to the lever 90 under action of the biasing means or tension spring 106.

Operation

Fig. 1 shows the plow bottoms F operating at a fairly shallow depth. Let it be assumed that the operator desires to manually cause raising of the plow. To do so, he moves the hand lever 54 forwardly or in a clockwise direction. The rod or link 74 then exerts a forward force on the lever 72. Regardless of the position of the force-transmitting member 108 (as among A, B, C, D and E), the point 110 becomes a fulcrum for counterclockwise swinging of the lever 72, resulting in a rearwardly directed force through the link 112 to rock the actuator 38 in a counterclockwise direction. This, as previously described, depresses the high-pressure poppet valve 46 and admits fluid under pressure from the pump 50 to the left-hand end of the cylinder 22 via the motor chamber 40 and motor line 42. The exhaust poppet valve 48 will, of course, remain closed. Let it now be assumed that the force-transmitting member 108 is in the A position of Fig. 2. As the rockshaft 28 rocks in a clockwise direction to effect raising of the plow, a gradually diminishing portion of the position responder cam 56 is presented to the control lever arm 102 at the contact 103. The tension spring 106 exerts a force on the lever 100 so as to cause the lever to rock in a clockwise direction to follow the responder cam 56. The spring 118, operating in conjunction with the foregoing, causes the member 108 to move to the right. Since the position of the hand lever 54 is retained by the sector 62, the fulcrum for clockwise swinging of the lever 72 as induced by the member 108 and spring 118 is about the pivotal connection 75 between the lever 72 and the rear end of the rod 74. Hence, as the top end of the lever 72 moves forwardly, it acts through the link 112 to effect clockwise rocking of the actuator 38, allowing the high pressure poppet valve 46 to close under the action of its spring. The degrees of movement are so designed that when the fluid pressure supply to the cylinder 22 is cut off, movement of the parts will cease and the actuator 38 will not over-travel to cause opening of the exhaust poppet 48.

In connection with all of the above, it should be appreciated that the suspension 68 between the pivot 66 and the link 72 is of a floating nature and merely supports the linkage, serving no other purpose and not interfering at all with the operation of the linkage.

Lowering of the plow by the power unit L is accomplished by moving the hand lever 54 to the rear, and the plow descends to the ground by its own weight. As the tractor moves forwardly, the plow bottoms F will seek the level determined by the position of the hand lever.

When the adjustable force-transmitting member 108 is in the position of Fig. 2, variations in draft or load have absolutely no effect on the system. For example, should the draft or load increase, causing a forward thrust in the top link 20, which will be transmitted to the load responder 58, the forward end of the responder will move forwardly. The spring 106 between the levers 90 and 100 will tend to produce a toggle or buckling action in the levers, resulting in rearward swinging of the portion 128 of the lever 100. However, this will have no effect on the force-transmitting member 108, since the lever 100 will merely fulcrum on the position responder 56 at the point 103. In other words, there is in the arm 102 of the lever 100 a zero moment effective on the roller 114 of the member 108. Therefore, when the system is set as in Fig. 2, it is strictly a position-responsive system.

The arrangement just described may be considered as one in which the lever 100 is movable selectively by the position and load responders 56 and 58, the one end 128 of the lever being considered as a first element connected to and movable by the load responder and the other end 103 of the lever being considered as a second element connected to and movable by the position responder. The connection of the first element just referred to is effected by the lever 90, it being noted, as previously discussed, that the lever 90 could be rigid on the load responder 58, if it is desired to omit the pivot 92. The two elements referred to respectively have motion-transmitting portions, the first being represented by the portion 128 and the second being represented by the upper end of the lever arm 102, as at 134. The force-transmitting member 108 is movably connected to the actuator 38 by means of the connections 70, 72, 110 and 112 and is movable relative to the element portions 128 and 134 for selected positioning to derive motion exclusively from one element or the other. For example, in Fig. 2, the member 108 is deriving motion exclusively from the portion 134 as the lever arm 102 fulcrums at 98. In Fig. 3, when the force-transmitting member 108 has been moved to position E, it derives motion exclusively from the other motion-transmitting portion 128 as the lever arm 102 fulcrums at 103.

The difference between the positions of Figs. 2 and 3 is one of responsiveness of the system to position or load. Let it be assumed that the tractor and plow are operating at a fairly shallow depth as in Fig. 1 and that the force-transmitting member 108 is in the position of Fig. 3. Now, if, because of soil density or other conditions, the draft load on the plow and tractor increases, the thrust developed in the top link 20 will cause forward movement of the load responder 58, resulting in counterclockwise swinging of the lever 90. This movement is followed by, of course, rearward movement of the motion-transmitting portion 128. Since the force-transmitting member 108 is directly in contact with the portion 128, the motion derived therefrom will swing the lever 72 in a counterclockwise direction, the fulcrum being the pivotal connection 75 between the lever 72 and the rod 74. As the upper end of the link 72 swings rearwardly, it will act through the link 112 to rock the actuator 38 in a counterclockwise direction, thus depressing the high-pressure poppet valve 46 and admitting fluid under pressure from the pump 50 to the left-hand end of the cylinder 22, causing the power unit L to raise the plow P. As the plow bottoms F reach a shallower operating depth, the draft or load again falls off until it is again balanced against the spring 78, whereupon compression in the top link 20 is relaxed and the load responder 58 can move again to the left, followed by forward shifting of the element portion 128 and allowing the actuator 38 to close the high-pressure poppet valve 46 and again hydraulically lock the system. During this phase of operation, the lever arm 102 merely fulcrums at 103 on the position responder cam 56. Even though the cam changes position, it does not contribute to the control of the system, since, when the member 100 is moved by the position responder 56, it fulcrums at the hinge connection 98 and the moment arm acting on the force-transmitting member 108 via the roller 114 is substantially zero. In other words, when 103 is the fulcrum, motion is derived from the portion 128, and when 98 is the fulcrum, motion is derived from the upper end 134 of the lever.

From the description thus far, it will be seen that the control system is capable of operating as a position-responsive system (Fig. 2) or as a load-responsive system (Fig. 3). The various advantages of both of these systems are well known and the previously described arrangement permits selective use of either. However, the present invention goes beyond that in providing for position-compensated adjustment or selection so that the advantages of both systems may be combined. There are times when it is desirable to have the valve actuator 38 operative in sequential response to both responders 58 and 56, preferably in that order. For that reason, the intermediate positions B, C and D have been provided. In this respect, it should be noted that an infinite number of intermediate positions could be established, depending upon the proportional difference desired between the results of the responders 56 and 58. This will become clear as the description proceeds.

As established by the foregoing description of the operation of the system when operating as in Fig. 2 and in Fig. 3, operation of the actuator 38 depends upon the position of the force-transmitting member 108 and that in turn depends upon which of the two elements 128 or 134 is delivering the initiating force. As already stated, the member 108 in the Fig. 2 position can derive motion exclusively from the position responder 56. In Fig. 3, the member 108 derives motion exclusively from the load responder 58. As will appear below, the track 116 on the lever arm 102 is a third element (in addition to the elements 128 and 134) moved at times by both responders 56 and 58, and the selector means operates to selectively connect the force-transmitting member to any one of said elements.

Let it now be assumed that the selector lever 126 is set in position C, resulting in positioning of the roller 114 midway between the positions of Figs. 2 and 3 and therefore engaging an intermediate portion of the third element 116. Hence, during plowing, the force-transmitting member 108 will derive motion in sequence from both responders, first from the load responder 58 and second from the position responder 56. In the initial adjustment of the plow to select the working depth by the hand lever 54, the operating position of the plow will be determined in the first instance by the position responder 56 since the actuator 38 will be returned to neutral when the rockshaft 28 attains a position proportional to movement of the lever 54, but as plowing begins, the system will be influenced by the load responder 58. For example, when the operator moves the hand lever 54 to an intermediate position, as in Fig. 1, the actuator 38 is rocked in a clockwise direction to depress the exhaust poppet valve 48 so that the plow lowers under its own weight. As the plow moves downwardly, the rockshaft 28 rocks in a counterclockwise direction and the effect of the cam 56 progressively increases, causing rearward shifting of the control lever 100, thereby transmitting force through the member 108 to neutralize the actuator 38. If it be assumed that the load responder 58 is stationary in these circumstances, the fulcrum for the lever 108 will be the hinge connection 98 and the moment arm acting against the member 108 will be substantially one-half of the distance between the element portions 128 and 134. In other words, the member 108 derives its motion not from either of the elements 128 or 134 but from the motion-transmitting means established by the third element 116 as represented by the selected intermediate portion of the lever arm 102. In the form of the invention disclosed here this motion-transmitting means interconnects the two elements 128 and 134. Since the motion-transmitting means bridges and interconnects the elements 128 and 134, and further since it has the arcuate track 116, the adjustment of the member 108 among the several positions is relatively simple.

Continuing with position C: let it be assumed that the tractor and plow continue forwardly, with the plow bottoms F operating at the level shown, for example, in Fig. 1. Now, should the draft increase, the load responder 58 will be moved forwardly, permitting the control lever 100 to fulcrum at 103 to exert a rearward force on the member 108 which in turn operates through the interconnecting actuator linkage to turn the actuator 38 in a counterclockwise direction to depress the high-pressure poppet valve 46, thereby resulting in a raising influence on the power unit L. As the power unit raises the plow, the rockshaft 28 rocks in a clockwise direction and the effective surface of the cam 56 progressively diminishes, followed by the upper end of the lever arm 102 because of the influence of the spring 106. Hence, the force-transmitting member 108, under action of the spring 118, moves forwardly and rocks the actuator 38 in a clockwise direction, permitting the poppet valve 46 to close. In other words, the system as arranged with the force-transmitting member 108 in position C need not await the occurrence of a draft value as low as that originally established but will operate to neutralize the actuator sooner, because of the influence of the position responder. Accordingly, the plow will not raise to as high a position as it would were the system operating strictly in draft or load control. Therefore, the changes in position of the plow will be in smaller increments and the plow will operate at a new draft load greater than the original load but less than the load that caused operation of the load responder 58.

The proportionate effect of the two responders 56 and 58 on the actuator 38 may be adjusted by changing the position of the force-transmitting member 108. In other words, the closer the roller or follower 114 on the member 108 is moved to position A, the more the actuator 38 will be responsive to the position responder 56 and vice versa. Considered otherwise the force-transmitting member 108 may be considered as a sensing means affecting the actuator 38 and consequently affecting the rockshaft 28, and the amount of movement that this sensing means will have as between the responders is directly proportional to the change in position thereof along the track 116, with the influence from one responder increasing as the influence from the other responder decreases. Thus, the operator has under his control a selective system in which he can derive all of the advantages from either of the well known load or position responsive systems, together with the advantages obtained by combining the two. The combination can be effected in various degrees, according to the setting of the selector arm 126 in the intermediate positions B, C and D because the lever 100 is differentially responsive to both responders.

Various other features and advantages of the invention, not categorically enumerated herein, will undoubtedly occur to those versed in the art, as will many modifications and alterations in the preferred embodiment of the invention disclosed, all of which may be achieved without departing from the spirit and scope of the invention.

What is claimed is:

1. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: a control lever having first and second spaced apart fulcrum connections respectively to the position and load responders so that movement of the load responder rocks the lever about the first fulcrum connection and movement of the position responder rocks the lever about the second fulcrum connection; a force-transmitting member connected at one end to and for moving the actuator; and means engaging the other end of the member with the lever for movement by the lever, said engaging means being selectively positionable along the lever to vary the relationship thereof to the fulcrum connections and accordingly to vary the degree to which the member and actuator will be moved by one or the other or both responders.

2. The invention defined in claim 1, in which: the connection of the force-transmitting member to the actuator is pivotal on an axis transverse to the length of the lever so that the member is swingable along the lever, and the lever has an arcuate portion having said axis as a center and affording a track along which the engaging means is selectively positionable.

3. The invention defined in claim 1, in which: the means engaging the member with the lever includes a track portion lengthwise of the lever, a follower portion on said other end of the member and riding the track portion, and means biasing the follower portion against the track means; the connection of the member to the actuator includes a pivot about which the member is swingable to engage the follower portion with a selected part of the track portion; and a suspension link supports the member for movement by the lever in any selected position thereof, said suspension link being adjustable lengthwise of the track portion and swingable in the direction of movement of the member by the lever.

4. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: a cam movable by the position responder; a lever having cam-riding contact at one end with the cam and having a hinged connection at its other end to the load responder so that movement of the load responder rocks the lever about its contact with the cam and movement of the cam by the position responder rocks the lever about its hinged connection with the load responder; a force-transmitting member connected at one end to the actuator for moving said actuator; and means for selectively engaging the other end of the member with the lever at any one of several points spaced along the lever between the cam-riding contact and the hinged connection so as to vary the degree to which the member and the actuator will be moved by one or the other or both responders.

5. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: a first lever fulcrumed intermediate its ends on the tractor and connected at one end to the load responder to be rocked by said load responder; a second lever having first and second spaced apart fulcrum connections respectively to the position responder and to the other end of the first lever so that movement of the position responder rocks the second lever about said second fulcrum connected and rocking of the first lever by the load responder rocks the second lever about said first fulcrum connection; a force-transmitting member connected at one end to and for moving the actuator; and means engaging the other end of the member with the second lever for movement by said second lever, said engaging means being selectively positionable along said second lever to vary the relationship thereof to the fulcrum connections and accordingly to vary the degree to which the member and actuator will be moved by one or the other or both responders.

6. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: a control lever having first and second spaced apart fulcrum connections respectively to the position and load responders so that movement of the load responder rocks the lever about the first fulcrum connection and movement of the position responder rocks the lever about the second fulcrum connection; a force-transmitting member connected at one end to and for moving the actuator; and means engaging the other end of the member with the lever for movement by the lever, said engaging means and one of the fulcrum connections being adjustable relative to each other and lengthwise of the lever to vary the degree to which the member and actuator will be moved by the lever.

7. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: a first element movable by the load responder and having a movable motion-transmitting portion; a second element movable by the position responder and having a movable motion-transmitting portion spaced from the first element portion; and a force-transmitting member connected to and for moving the actuator, said member being movable relative to the actuator and relative to the element portions for selective positioning in a first position engaging and deriving motion exclusively from the first element and in a second position engaging and deriving motion exclusively from the second element portion; and means for moving said member to and for holding said member in either of said positions.

8. The invention defined in claim 7, including motion-transmitting means interconnecting the element portions and movable by said portions, and means positioning the force-transmitting member at a third position intermediate said first and second position for deriving motion from said motion-transmitting means.

9. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: compound servo means including a pair of elements individually movable respectively by the responders, each element having a motion-transmitting portion and said portions being spaced apart, and motion-transmitting means interconnecting and bridging said portions for movement in sequence first by one responder element and then by the other responder element; a force-transmitting member connected to and for moving the actuator and having a motion-receiving part for deriving motion from the servo means; and said part and the motion-transmitting portions being selectively relatively positionable among a first position in which said part derives motion exclusively from the load responder, a second position in which said part derives motion from the motion-transmitting means in the aforesaid sequence, and a third position in which said part derives motion exclusively from the position responder.

10. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: compound servo means including a first element moved exclusively by the load responder, a second element moved exclusively by the position responder, and a third element moved at times by the load responder and at other times by the position responder; a force-transmitting member connected to and for moving the actuator; and means for selectively engaging the force-transmitting member with any one of the elements.

11. In a tractor having means for the adjustable attachment of an implement thereto, a power unit on the tractor for adjusting the working position of the implement, a movable actuator for controlling the power unit, a position responder movable by the power unit in accordance with adjustment of the implement, and a load responder movable by the implement in accordance with changes in implement working load, the improvement comprising: compound servo means including a first element moved exclusively by the load responder, a second element moved exclusively by the position responder, and a third element moved differentially by both responders; a force-transmitting member connected to and for moving the actuator; and means for selectively engaging the force-transmitting member directly with any one of said elements.

12. In a tractor having means for the adjustable attachment of an implement thereto, a power unit on the tractor for adjusting the implement and including a rockshaft, and a shiftable actuator for controlling the power unit, the improvement comprising: fulcrum means on the tractor in spaced relation to the rockshaft; a cam on the rockshaft; a control lever having one end rockably supported by the fulcrum means and a second end riding the cam; force-transmitting means connected to the actuator and engaged with the lever; and means for selectively positioning the force-transmitting means between the ends of said lever.

13. In a tractor having means for the adjustable attachment of an implement thereto, a power unit on the tractor for adjusting the implement and including a rockshaft, and a shiftable actuator for controlling the power unit, the improvement comprising: cam means driven by the rockshaft; fulcrum means on the tractor in spaced relation to the cam means; a control lever having one end rockably supported by the fulcrum means and a second end riding the cam means; force-transmitting means connected to the actuator and engaged with the lever; and means for selectively positioning the force-transmitting means between the ends of said lever.

References Cited in the file of this patent

UNITED STATES PATENTS

| | | |
|---|---|---|
| 2,631,515 | McRae | Mar. 17, 1953 |
| 2,715,863 | Bunting | Aug. 23, 1955 |
| 2,721,508 | Edman | Oct. 25, 1955 |
| 2,722,873 | Garmager | Nov. 8, 1955 |
| 2,722,874 | Bopf | Nov. 8, 1955 |
| 2,786,402 | Senkowski et al. | Mar. 26, 1957 |

FOREIGN PATENTS

| | | |
|---|---|---|
| 1,075,023 | France | Apr. 7, 1954 |